US010435035B2

(12) United States Patent
Wiegand et al.

(10) Patent No.: US 10,435,035 B2
(45) Date of Patent: Oct. 8, 2019

(54) SCREEN REDUCTION SYSTEM FOR AUTONOMOUS VEHICLES

(71) Applicant: DENSO International America, Inc., Southfield, MI (US)

(72) Inventors: Michael Wiegand, Birmingham, MI (US); Charles Hummer, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 16/159,928

(22) Filed: Oct. 15, 2018

(65) Prior Publication Data

US 2019/0111945 A1 Apr. 18, 2019

Related U.S. Application Data

(60) Provisional application No. 62/573,261, filed on Oct. 17, 2017.

(51) Int. Cl.
*B60Q 1/00* (2006.01)
*B60W 50/14* (2012.01)
(Continued)

(52) U.S. Cl.
CPC ............ *B60W 50/14* (2013.01); *B60K 35/00* (2013.01); *B60W 40/08* (2013.01); *G05D 1/0088* (2013.01); *G05D 1/0238* (2013.01); *G05D 1/0246* (2013.01); *G06K 9/00845* (2013.01); *B60K 2370/1529* (2019.05); *B60K 2370/177* (2019.05); *B60K 2370/178* (2019.05); *B60K 2370/179* (2019.05);
(Continued)

(58) Field of Classification Search
CPC ............... B60W 50/14; B60W 40/08; B60W 2040/0818; B60W 2050/146; B60K 35/00; B60K 2350/2052; B60K 2350/962; B60K 2350/965; G05D 1/0088; G05D 1/0238; G05D 1/0246; G05D 2201/0213; G06K 9/00845
See application file for complete search history.

(56) References Cited

U.S. PATENT DOCUMENTS 8,489,284 B2 * 7/2013 Emam .................... G06N 5/02
340/438
8,757,807 B1 6/2014 Disley
(Continued)

FOREIGN PATENT DOCUMENTS

EP 2625056 B1 1/2015
JP 2015217798 A 12/2015
(Continued)

*Primary Examiner* — Quang Pham
(74) *Attorney, Agent, or Firm* — Harness, Dickey & Pierce, P.L.C.

(57) ABSTRACT

A vehicle includes at least one of a camera and a proximity sensor for detecting an obstacle in a vehicle path. A screen is projected on a windshield of the vehicle. A driver inattention determination unit determines a driver attentiveness. A danger level determination unit determines a danger level on a danger scale according to one or more of the driver attentiveness, a driving condition, a driving hazard, and the presence of the obstacle. A driver alert unit reduces a size of the screen on the windshield proportional to the danger level.

12 Claims, 7 Drawing Sheets

(51) Int. Cl.
*B60K 35/00* (2006.01)
*G05D 1/00* (2006.01)
*G05D 1/02* (2006.01)
*G06K 9/00* (2006.01)
*B60W 40/08* (2012.01)

(52) U.S. Cl.
CPC ............ *B60K 2370/1868* (2019.05); *B60K 2370/193* (2019.05); *B60K 2370/334* (2019.05); *B60W 2040/0818* (2013.01); *B60W 2050/146* (2013.01); *G05D 2201/0213* (2013.01)

(56) References Cited

U.S. PATENT DOCUMENTS

| | | | | |
|---|---|---|---|---|
| 9,487,139 | B1 * | 11/2016 | Ishida | B60W 50/14 |
| 2003/0151516 | A1 * | 8/2003 | Basir | G08B 21/06 |
| | | | | 340/575 |
| 2009/0189753 | A1 * | 7/2009 | Enya | G02B 27/01 |
| | | | | 340/435 |
| 2009/0237226 | A1 * | 9/2009 | Okita | B60W 10/184 |
| | | | | 340/435 |
| 2009/0237268 | A1 * | 9/2009 | Tomoyuki | B60Q 11/005 |
| | | | | 340/901 |
| 2011/0128139 | A1 * | 6/2011 | Tauchi | B60K 35/00 |
| | | | | 340/439 |
| 2011/0254863 | A1 * | 10/2011 | Hoshino | G01C 21/36 |
| | | | | 345/660 |
| 2013/0215274 | A1 * | 8/2013 | Son | B60W 40/09 |
| | | | | 348/149 |
| 2013/0241747 | A1 * | 9/2013 | Hatakeyama | B60K 35/00 |
| | | | | 340/901 |
| 2014/0228073 | A1 * | 8/2014 | Fratti | H04W 4/026 |
| | | | | 455/556.1 |
| 2015/0168720 | A1 * | 6/2015 | Oh | B60R 1/00 |
| | | | | 345/690 |
| 2015/0202962 | A1 | 7/2015 | Habashima et al. | |
| 2016/0280190 | A1 * | 9/2016 | Franz | G08G 1/166 |
| 2017/0187963 | A1 * | 6/2017 | Lee | G06F 3/013 |
| 2017/0286783 | A1 * | 10/2017 | Yim | G01B 11/00 |
| 2017/0305342 | A1 * | 10/2017 | Tomioka | B60R 1/00 |
| 2017/0330455 | A1 * | 11/2017 | Kikuchi | G06K 9/00798 |
| 2018/0059667 | A1 * | 3/2018 | Kuroda | B60W 40/068 |
| 2018/0072310 | A1 * | 3/2018 | Fung | B60K 28/06 |
| 2018/0268695 | A1 * | 9/2018 | Agnew | B60W 50/0098 |
| 2018/0322783 | A1 * | 11/2018 | Toyoda | G06T 19/006 |
| 2019/0061750 | A1 * | 2/2019 | Tamura | B60W 30/095 |

FOREIGN PATENT DOCUMENTS

| | | |
|---|---|---|
| JP | 2016091058 A | 5/2016 |
| KR | 101628693 B1 | 6/2016 |

* cited by examiner

SCREEN REDUCTION SYSTEM FOR AUTONOMOUS VEHICLES

CROSS-REFERENCE TO RELATED APPLICATIONS

This application claims the benefit of U.S. Provisional Application No. 62/573,261, filed on Oct. 17, 2017. The entire disclosure of the above application is incorporated herein by reference.

FIELD

The present disclosure relates to systems and methods for an emergency screen reduction system in an autonomous vehicle, and more particularly, an emergency screen reduction system that monitors a situation and a driver's behavior and reacts to direct a driver's focus back to the road.

BACKGROUND

This section provides background information related to the present disclosure which is not necessarily prior art.

With the continued advancement and increased usage of autonomous vehicle technology, drivers have an increased ability to perform other tasks while the vehicle is driving, such as watch a movie or work on a computer. With the driver's focus placed elsewhere, the vehicle is left to perform obstacle detection and collision avoidance.

Various systems exist for obstacle detection and collision avoidance. For example, radar and camera systems are used to sense lead vehicles, pedestrians, and other relevant objects. Dedicated short-range communication (DSRC) systems may also be used to detect other vehicles and pedestrians having DSRC equipment. Autonomous vehicle systems use these obstacle detection and collision avoidance systems while autonomously operating the vehicle. However, when a vehicle needs to avoid an obstacle, for example, a user may need to react or be prepared to take control of the vehicle.

The present teachings provide for an emergency screen reduction system that addresses the issues addressed above and provides numerous advantages, as explained herein and as one skilled in the art will recognize.

SUMMARY

This section provides a general summary of the disclosure, and is not a comprehensive disclosure of its full scope or all of its features.

An example vehicle according to the present disclosure includes at least one of a camera and a proximity sensor for detecting an obstacle in a vehicle path. A screen is projected on a windshield of the vehicle. A driver inattention determination unit determines a driver attentiveness. A danger level determination unit determines a danger level on a danger scale according to one or more of the driver attentiveness, a driving condition, a driving hazard, and the presence of the obstacle. A driver alert unit reduces a size of the screen on the windshield proportional to the danger level.

An example vehicle may further include a driver inattention determination unit that determines the driver attentiveness based on one or more of a driver's head position, utilization of the screen projected on the windshield, driver breathing rate, driver eye path, driver eye lid position, driver heart rate, driver oxygen level, driver head movement, and driver body posture.

An example vehicle may further include a driver alert unit that reduces the screen to 30% in size when the danger level is 50%.

An example vehicle may further include a driver alert unit that triggers at least one of an audible alert and a tactile alert when the danger level is 100%.

An example vehicle may further include a driver alert unit that removes the screen when the danger level is 100%.

An example vehicle may further include a driver alert unit that replaces the screen with an augmented reality screen displaying markers to highlight obstacles when the danger level is 100%.

An example vehicle may further include a driver alert unit that reduces the size of the screen and moves the screen to a center of the windshield when the danger level is 50%.

An example vehicle may further include a driver alert unit that increases a transparency of the screen in proportion to the danger level.

An example method for providing various warnings to a driver of an obstacle or hazardous road condition according to the present disclosure includes projecting a screen on a windshield of a vehicle; detecting, by at least one of a camera and a proximity sensor, an obstacle in a vehicle path; determining, by a driver inattention determination unit, a driver attentiveness; determining, by a danger level determination unit, a danger level on a danger scale according to one or more of the driver attentiveness, a driving condition, a driving hazard, and the presence of the obstacle; and reducing, by a driver alert unit, a size of the screen on the windshield proportional to the danger level.

An example method may further include determining the driver attentiveness based on one or more of a driver's head position, utilization of the screen projected on the windshield, driver breathing rate, driver eye path, driver eye lid position, driver heart rate, driver oxygen level, driver head movement, and driver body posture.

An example method may further include reducing, by the driver alert unit, the screen to 30% in size when the danger level is 50%.

An example method may further include triggering, by the driver alert unit, at least one of an audible alert and a tactile alert when the danger level is 100%.

An example method may further include removing, by the driver alert unit, the screen when the danger level is 100%.

An example method may further include replacing, by the driver alert unit, the screen with an augmented reality screen displaying markers to highlight obstacles when the danger level is 100%.

An example method may further include reducing, by the driver alert unit, the size of the screen and moves the screen to a center of the windshield when the danger level is 50%.

An example method may further include increasing, by the driver alert unit, a transparency of the screen in proportion to the danger level.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present teachings advantageously provide systems and methods to provide various warnings to a driver of an obstacle or hazardous road condition. A driver may be alerted if the driver is watching a movie or working on a computer screen projected on the vehicle windshield, the driver's head is tilted from a vertical position, the driver's breathing rate is slowed compared to average, there is a traffic jam within a threshold distance, there is construction within a threshold distance, there are obstacles in the roadway, the roadway is damaged, there is weather that will affect the accuracy of the vehicle's sensors, or there is any other hazardous condition requiring the driver's attention. The alert can include reducing a screen size on the vehicle windshield, pausing a movie or freezing a computer screen on the windshield, drawing an arrow on the windshield to indicate an obstacle, sounding an alert, shaking or vibrating a driver's seat, or performing other alerts to focus the driver's attention on the hazard. Drivers will not be alerted, however, when the system does not detect a hazard and only the driver's inattention is indicated.

Figure 1:
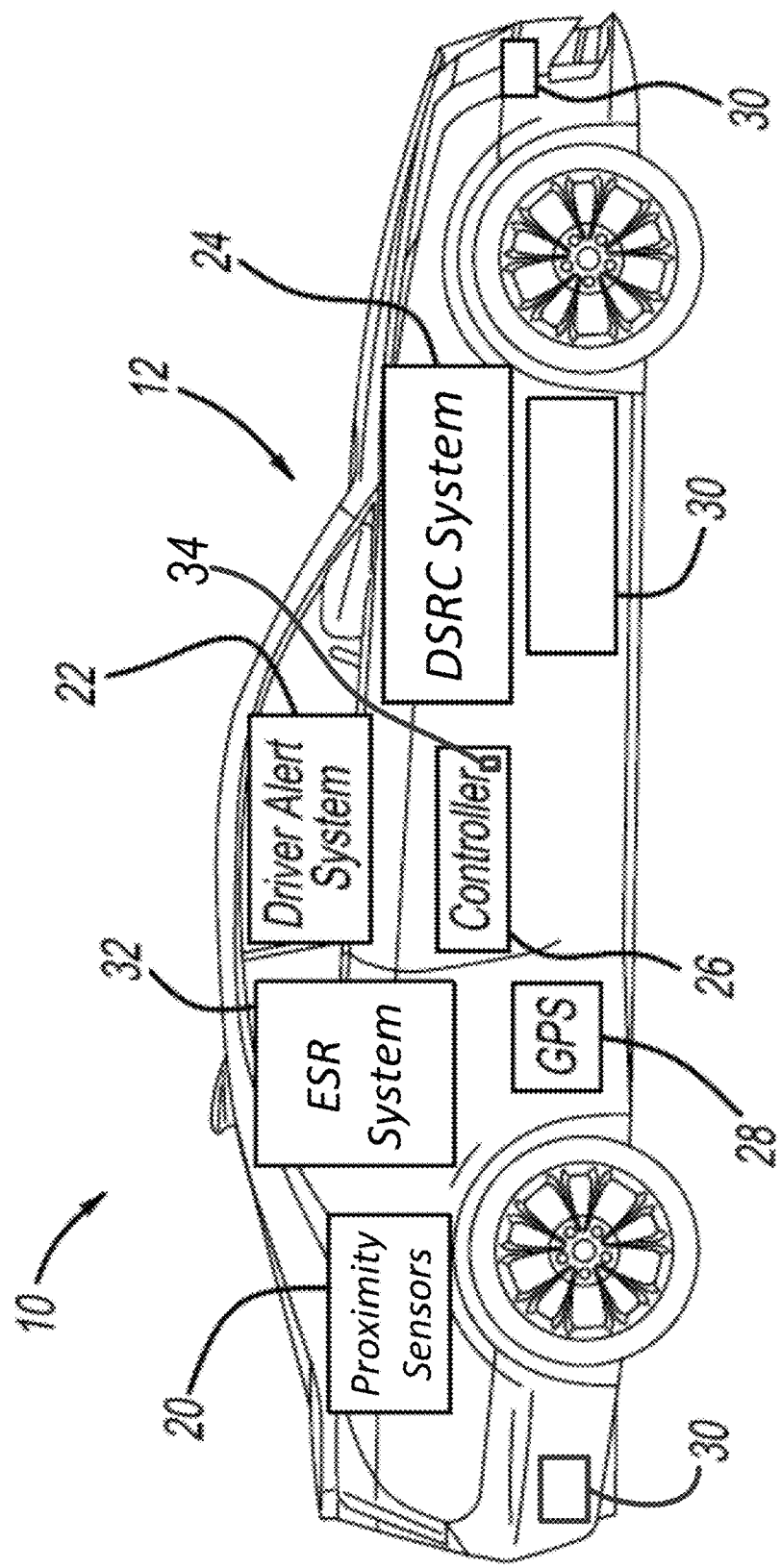
FIG. 1 illustrates an example subject vehicle including an emergency screen reduction system according to the present teachings.

With reference to FIG. 1, a vehicle 10 including a control system 12 with an emergency screen reduction system according to the present teachings is illustrated. Although the vehicle 10 is illustrated as an automobile in FIG. 1, the present teachings apply to any other suitable vehicle, such as a sport utility vehicle (SUV), a mass transit vehicle (such as a bus), or a military vehicle, as examples. The vehicle 10 may be a partially or fully autonomous vehicle configured to autonomously drive the vehicle and enable a driver of the vehicle 10 to take control of the vehicle 10, as necessary. The system 12 is configured to, among other things, inform a driver of the vehicle 10 (often referred to as the subject vehicle) of hazards or obstacles necessitating the driver to take control of the vehicle 10 away from an autonomous operation system. The system 12 may generally include one or more proximity sensors 20, a driver alert system 22, a dedicated short range communication (DSRC) system 24, a controller 26, a global positioning system (GPS) or global navigation satellite system (GLASS) 28, one or more cameras 30, and an emergency screen reduction (ESR) system 32. The controller 26 can be any suitable controller for monitoring and/or controlling one or more of the proximity sensors 20, the driver alert system 22, the DSRC system 24, the GPS/GNSS 28, one or more of the cameras 30, the emergency screen reduction system 32 and/or the additional vehicle systems, sensors, and functions. The controller may also include an autonomous vehicle control system 34. In this application, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein.

The proximity sensors 20 may include one or more sensors configured to identify and/or detect the presence of objects, such as pedestrians, cyclists, or other vehicles, in one or more areas around the subject vehicle 10. The proximity sensors 20 can include any suitable sensors, such as any suitable radar, laser, camera, ultrasonic, or other suitable sensors for detecting objects in an area around the subject vehicle 10. The proximity sensors 20 can be mounted at any suitable position on the subject vehicle 10, such as in the front of the subject vehicle 10, rear of the subject vehicle 10, near the front corners of the subject vehicle 10, near the back corners of the subject vehicle 10, or along the sides of the subject vehicle 10.

The one or more cameras 30 include one or more cameras configured to identify and/or detect the presence of objects, such as pedestrians, cyclists, or other vehicles, in one or more areas around the subject vehicle 10. The cameras 30 may also be used to determine the state of a traffic light (i.e., red, green, or yellow). The cameras 30 can include any suitable camera for detecting objects in an area around the subject vehicle 10. The cameras 30 can be mounted at any suitable position on the subject vehicle 10, such as in the front of the subject vehicle 10, rear of the subject vehicle 10, near the front corners of the subject vehicle 10, near the back corners of the subject vehicle 10, or along the sides of the subject vehicle 10.

Figure 2:
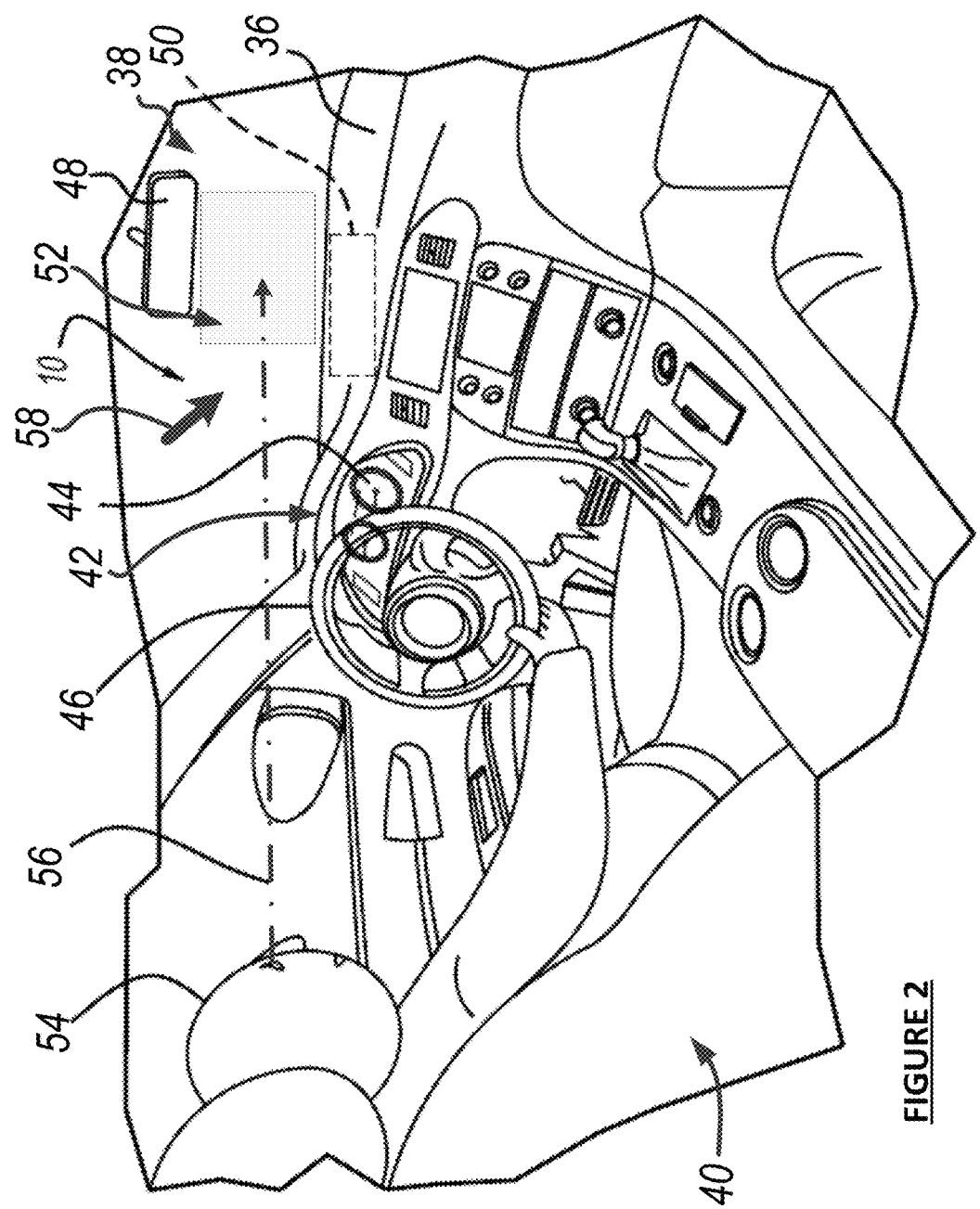
FIG. 2 illustrates an interior of the subject vehicle of FIG. 1.

Referring to FIG. 2, the interior of the vehicle 10 may include at least a dashboard 36, a windshield or window 38, and a driver's seat 40. The dashboard 36 may be connected to the windshield 38 and may include an instrument panel 42 having various gauges 44. A steering wheel 46 for controlling the direction of the vehicle 10 may extend from the instrument panel 42, below the gauges 44. A rearview mirror 48 may be mounted on the windshield 38 in a position providing an optimum view of the environment behind the vehicle 10. A heads-up display 50 may be disposed in the dashboard 36 and may project a picture or screen 52 on the windshield 38 for a driver's view. For example only, the screen 52 may be projected on the windshield 38 using a transparent organic light emitting diode (OLED), a liquid crystal display (LCD) projection, a digital light processing (DLP) projection, or any other method of projecting a screen on the windshield 38. Using a transparent OLED, the display may be the same size as the windshield. In other embodiments, the display may be any size relative to the windshield or may be on a portion of the dashboard without utilizing the windshield. The driver 54 may be positioned in the driver's seat 40 and may have a line of sight 56 directed at the picture or screen 52 on the windshield 38.

During different danger levels (described below) determined by the emergency screen reduction system 32, the picture or screen 52 may be reduced or enlarged according to a specific danger level. If the heads-up display 50 is projecting a movie as the picture or screen 52, the movie may be paused. Additionally, the picture or screen 52 may be removed completely from the windshield 38 and an arrow 58 may be drawn by the heads-up display to indicate an obstacle ahead. These modifications to the picture or screen 52 and windshield 38 may be performed in order to refocus the driver's line of sight 56 on a condition or hazard in the roadway and potentially prepare the driver 54 to take control of the vehicle 10.

While the screen 52 is described as being a movie, the screen 52 may be any projection, such as a computer screen, any data, data or a movie from a linked mobile device (for example a s a phone or tablet), an existing heads-up display (for example a vehicle speed, gas gauge, navigation information, or other vehicle information). Further, as previously stated, the screen 52 may be on the windshield, the dashboard, a portion of each of the windshield and the dashboard, or on any other portion of the interior of the vehicle. For example, if the screen 52 is using a the heads-up display to project a movie, the movie may shrink to a bottom corner of the screen 52 to display vehicle or navigation information or may shrink to the bottom corner of the screen 52 as the danger level is increased.

Figure 3:
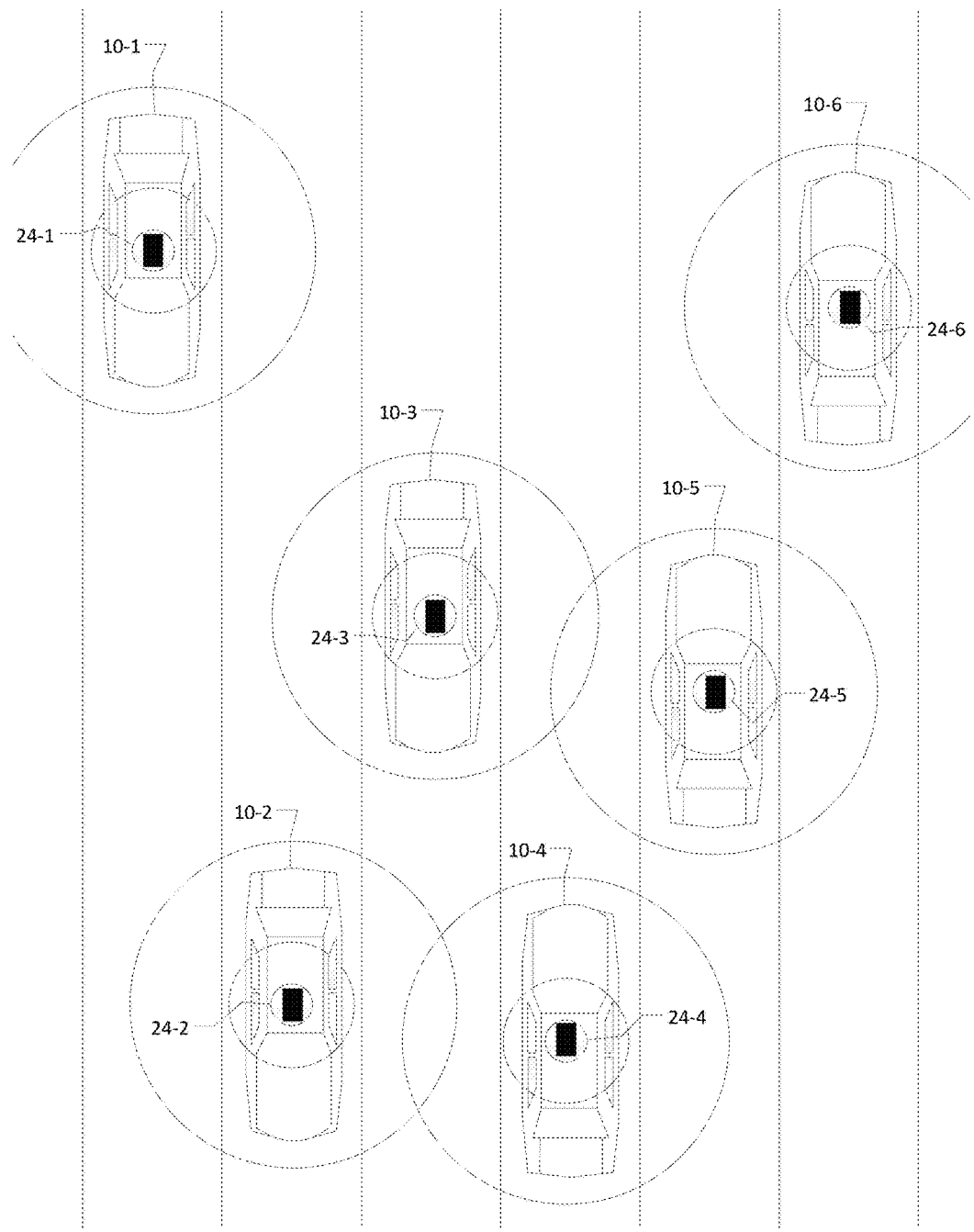
FIG. 3 illustrates the subject vehicle of FIG. 1 in a heavy traffic driving condition.
Figure 4:
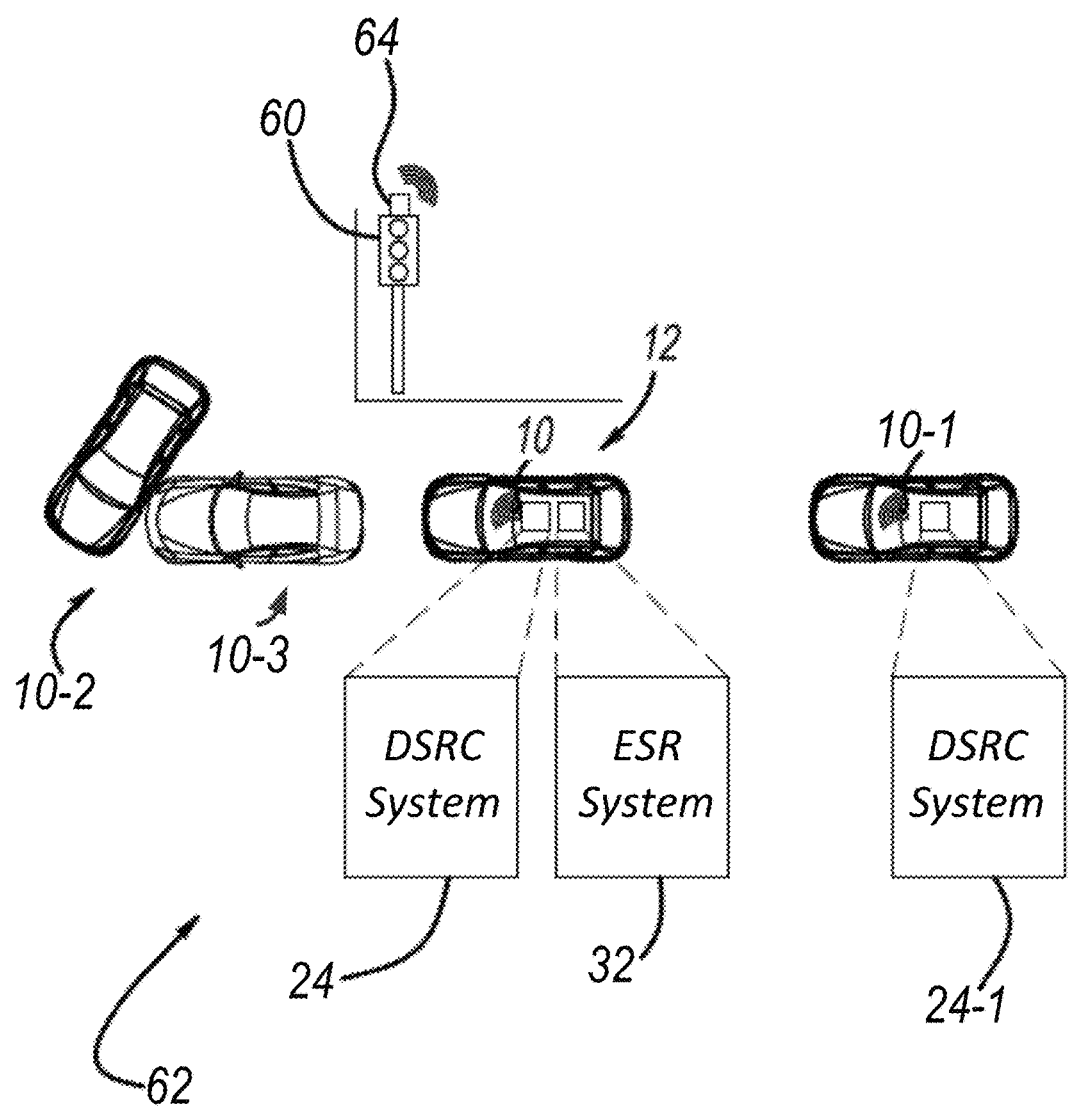
FIG. 4 illustrates the subject vehicle of FIG. 1 in an intersection where there is a traffic accident in the intersection after the subject vehicle's traffic light changes to green.
Figure 5:
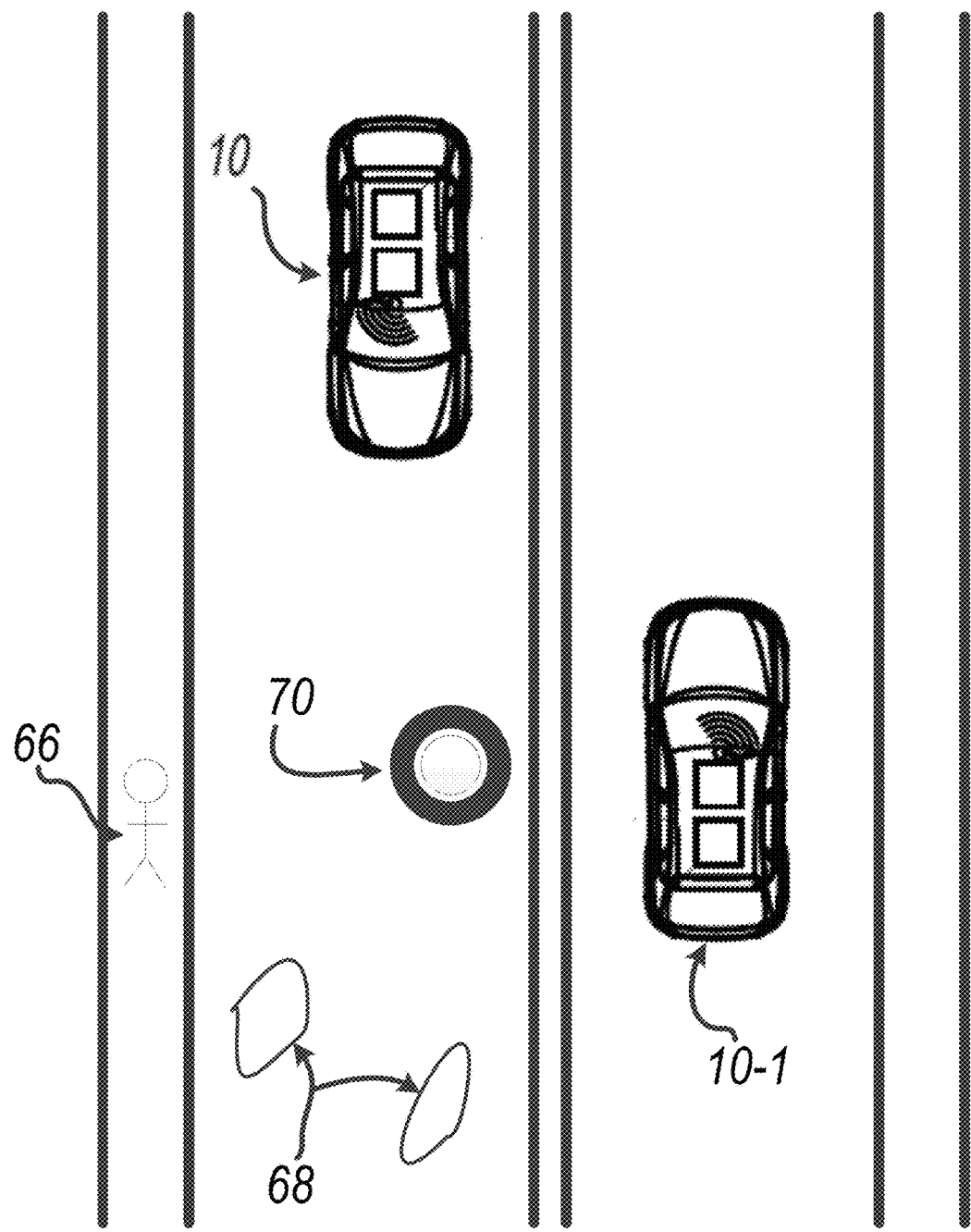
FIG. 5 illustrates the subject vehicle of FIG. 1 driving with various obstacles in the roadway.
Figure 6:
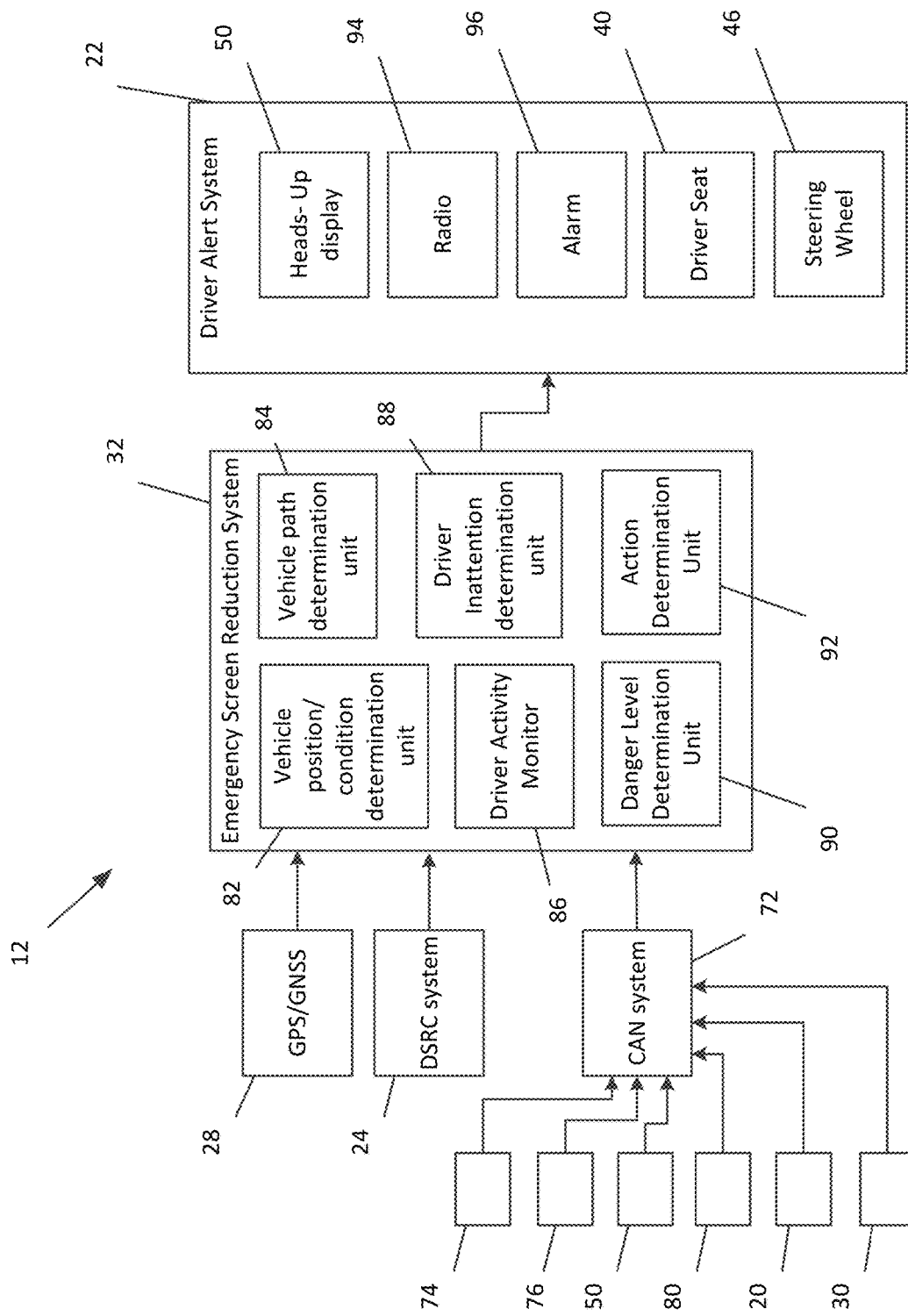
FIG. 6 illustrates a block diagram of an example system according to the present teachings for detecting a danger level and providing various warnings to a driver of a hazardous condition.

With reference to FIGS. 3-5, and as discussed in further detail below, the system 12 is configured to alert the driver of the subject vehicle 10 based on monitored or received traffic signal information, surrounding object information, traffic information, and/or road information.

For example, with reference to FIG. 3, the subject vehicle 10, including the system 12, could be in a high volume traffic condition. For example only, a high volume traffic condition may occur when at least two vehicles 10-1, 10-2, . . . , 10-*n* are each within a threshold distance from the subject vehicle 10. The threshold distance may be within a range of 0 feet to 20 feet, and more specifically within a range of 10 feet to 15 feet. As illustrated in FIG. 2, it is common, especially in urban areas, for a large number of vehicles 10-1, 10-2 . . . 10-*n* to be utilizing the roadway simultaneously. One or more of the vehicles 10-1, 10-2 . . . 10-*n* may have the features described with respect to the subject vehicle 10, and more particularly, may include DSRC systems 24-1, 24-2 . . . 24-*n* for vehicle-to-vehicle communication. If one or more of the vehicles 10-1, 10-2 . . . 10-*n* do not include a DSRC system 24, the subject vehicle 10 may detect the presence of the vehicles 10-1, 10-2 . . . 10-*n* using the cameras 30 and/or proximity sensors 20 on the subject vehicle 10.

During autonomous vehicle operation, the autonomous vehicle control system 34 and the controller 26 may be equipped to operate the vehicle in the high volume traffic condition without driver intervention. However, the high volume traffic condition may increase a danger level (described below) determined by the emergency screen reduction system 32. Additionally, high volume traffic conditions are suitable environments for traffic jams, quick braking, accidents, emergency braking, etc., which all may increase the danger level determined by the emergency screen reduction system 32 leading to an alarm and driver intervention.

In another example, with reference to FIG. 4, the subject vehicle 10 may be stopped at a traffic signal 60 in an intersection 62. Other vehicles 10-1, 10-2 . . . 10-*n* may be in the vicinity and/or may be in an accident or collision within the intersection 62. One or more of the vehicles 10-1, 10-2 . . . 10-*n* may have the features described with respect to the subject vehicle 10, and more particularly, may include DSRC systems 24-1, 24-2 . . . 24-*n* for vehicle-to-vehicle communication. If one or more of the vehicles 10-1, 10-2 . . . 10-*n* do not include a DSRC system 24, the subject vehicle 10 may detect the presence of the vehicles 10-1, 10-2 . . . 10-*n* using the cameras 30 and/or proximity sensors 20 on the subject vehicle 10. Further, the traffic signal 60 may include a DSRC system 64 which communicates with the DSRC system 24 on the subject vehicle 10 to rely traffic signal information such as the traffic light state (green, yellow, red).

During autonomous vehicle operation, the autonomous vehicle control system 34 and the controller 26 may be equipped to operate the vehicle in the intersection without driver intervention. However, the accident or collision may increase a danger level (described below) determined by the emergency screen reduction system 32.

In another example, with reference to FIG. 5, the subject vehicle 10 may be subject to hazards in the roadway. Hazards may include animals or pedestrians 66 crossing or walking along the roadway, potholes 68 in the road, objects 70, such as vehicle tires or debris, in the road, etc. Additional vehicles 10-1, 10-2 . . . 10-*n* may also be present on the roadway. One or more of the vehicles 10-1, 10-2 . . . 10-*n* may have the features described with respect to the subject vehicle 10, and more particularly, may include DSRC systems 24-1, 24-2 . . . 24-*n* for vehicle-to-vehicle communication. However, if one or more of the vehicles 10-1, 10-2 . . . 10-*n* do not include a DSRC system 24 or there are hazards 66, 68, 70 in the roadway, the subject vehicle 10 may detect the presence of the vehicles 10-1, 10-2 . . . 10-*n* and/or hazards 66, 68, 70 using the cameras 30 and/or proximity sensors 20 on the subject vehicle 10.

During autonomous vehicle operation, the autonomous vehicle control system 34 and the controller 26 may be equipped to operate the vehicle in the described environment without driver intervention. However, the presence of hazards 66, 68, 70 in the roadway may increase a danger level (described below) determined by the emergency screen reduction system 32.

With reference to FIG. 5, a block diagram of the control system 12 according to the present teachings for providing various warnings to a driver of an obstacle or hazardous road condition is shown. The control system 12 includes, among other systems, the GPS/GNSS 28, the DSRC system 24, a control area network (CAN) system or CAN bus 72, the emergency screen reduction system 32, and the driver alert system 22. The GPS/GNSS 28 provides time and position data along with movement and acceleration data of the subject vehicle 10. The DSRC system 24 performs vehicle to vehicle (V2V), vehicle to infrastructure (V2I), and vehicle to any other DSRC radio (V2X) communication to determine the location of other objects, vehicles, and/or people in relation to the subject vehicle 10. Also, the DSRC system 24 communicates with the DSRC radio 64 in the intersection 62 to determine traffic signal data, such as the timing of the traffic signal 60, the current state of the traffic signal 60, and map data, such as the layout of the intersection 62.

The CAN system 72 communicates with various sensors and vehicle systems and passes the information to the emergency screen reduction system 32. For example, the CAN system 72 communicates with the one or more proximity sensors 20 which identify and/or detect the presence of objects, such as other vehicles 10-1, 10-2 . . . 10-*n*, in one or more areas around the subject vehicle 10. The CAN system 72 also communicates with the one or more cameras 30, which may determine the placement or location of obstacles or hazards such as animals or pedestrians 66, potholes 68, tires or debris 70, etc., around the perimeter of the subject vehicle 10. In addition, the CAN system 72 communicates with a driver eye position sensor 74, driver breathing rate sensors 76, the heads-up display 50, and various vehicle mechanical sensors 80 identifying the state of the subject vehicle 10. The driver eye position sensor 74 provides the driver's line of sight 56, the driver breathing rate sensors 76 provide the driver's breathing rate, the heads-up display 50 provides the on/off state of the heads-up display 50, and the sensors 80 identify the state of the subject vehicle 10, such as whether there are any mechanical problems or a check engine light is illuminated and, if so, for what reason. In addition to the driver eye position sensor 74 and the driver breathing rate sensors 76, the CAN system 72 may communicate with various sensors to providing data related to eye gaze, eye lid position, heart rate, oxygen level, head movement, head position, head posture, and body posture. While a CAN system 72 is illustrated and described, it is understood that the CAN system can be any vehicle communication system and is not confined to the example control area network system or bus.

Once data is received from the GPS/GNSS 28, the DSRC system 24, and the CAN system 72, the emergency screen reduction system 32 performs various calculations and functions to determine whether and when to provide various warnings to a driver of an obstacle or hazardous road condition. The emergency screen reduction system 32 includes a vehicle position/condition determination unit 82 which uses data communicated by the GPS/GNSS 28 and CAN system 72 to determine the position of the subject vehicle 10 and whether the subject vehicle 10 is experiencing any malfunctions. Specifically, the vehicle position/condition determination unit 82 uses data from the GPS/GNSS 28 to determine the location of the subject vehicle 10 and whether the subject vehicle is moving. The vehicle position/condition determination unit 82 also uses data from the vehicle sensors 80 passed through the CAN system 72 to determine whether the vehicle 10 is accelerating, its direction of travel, and the overall mechanical state of the vehicle 10.

A vehicle path determination unit 84 uses data communicated from the GPS/GNSS 28, the DSRC system 24, and the CAN system 72 to determine the path of the subject vehicle 10 and whether there are any vehicles or objects within the path. Specifically, the vehicle path determination unit 84 may receive data from the DSRC system 24 detailing the layout of the intersection 62 and may receive data from the GPS/GNSS 28 that allows the vehicle path determination unit 84 to determine the position of the subject vehicle 10 within the layout of the intersection. Alternatively, the vehicle path determination unit 84 may receive location, speed, and direction data from the GPS/GNSS 28 that allows the vehicle path determination unit 84 to determine a vehicle path for the vehicle 10. The vehicle path determination unit 84 may also receive data from the sensors 80 (such as, for example, steering wheel angle and accelerator pedal position) which allows the vehicle path determination unit 84 to determine whether the vehicle path is straight ahead of the subject vehicle 10 or to the right or left of the subject vehicle 10. Lastly, the vehicle path determination unit 84 receives data from the one or more proximity sensors 20 and/or the one or more cameras 30 to determine the location of other vehicles, people, road hazards, and objects around the subject vehicle 10.

A driver activity monitor 86 receives data from the driver eye position sensor 74, the driver breathing rate sensors 76, and the heads-up display 50 which allows the driver activity monitor 86 to determine the driver's line of sight 56, the driver's breathing rate, the driver's head position, and the on/off state of the heads-up display 50. The driver activity monitor 86 receives data from the driver eye position sensor 74 through the CAN system 72 to determine both the driver's line of sight 56 and the driver's head position. The driver activity monitor 86 receives data from the driver breathing rate sensors 76 to determine the driver's breathing rate. In an alternative embodiment, the driver activity monitor 86 may receive data from cameras within the vehicle to determine the driver's breathing rate. The driver activity monitor 86 receives on/off data from the heads-up display 50 to determine whether the driver 54 is, for example, watching a movie or working on a computer screen projected on the windshield 38. The driver activity monitor 86 may also receive data from sensors relating to eye gaze, eye lid position, heart rate, oxygen level, head movement, head position, head posture, and body posture.

A driver inattention determination unit 88 may communicate with the driver activity monitor 86 to determine an attention level of the driver 54. The driver activity monitor 86 provides information relating to the driver's line of sight 56, the driver's breathing rate, the driver's head position, and the on/off state of the heads-up display 50. For example, if the driver's head is tilted from a vertical position and/or if the driver's breathing rate is slowed a predetermined threshold (for example, at least 10%) from the driver's average breathing rate (for example, the average over the first 30 minutes of driving), the driver inattention determination unit 88 may indicate a lack of attention in the driver.

A danger level determination unit 90 may communicate with the vehicle path determination unit 84, the driver inattention determination unit 88, the driver activity monitor 86, the proximity sensors 20, and the cameras 30 to determine a danger level. The danger level may be, for example, a rating on a scale of 1 to 10 that indicates the severity of the situation and conditions. The ratings on the scale may be may increase in danger levels, with 1 being the lowest level of danger, or safest, and 10 being the highest level of danger. The various occurrences or criteria that define each level on the scale may be set to fit a customer's desires, government standards/regulations, an automaker's standards, etc. In alternative embodiments, the danger level may be a rating on a different scale, a color, or any other rating system. An example danger level scale for an example embodiment may be as follows.

The danger level may be a zero if the driver 54 has complete control of the vehicle 10 and there are no hazards, heavy traffic conditions, or accidents in the vicinity. The danger level may be increased to a 1 if the vehicle is operating in autonomous mode, but the driver is paying attention to the roadway (determined from, for example, the driver's line of sight 56) and there are no hazards, heavy traffic conditions, or accidents in the vicinity. If the driver 54 elects to watch a video, work on a computer, or otherwise utilize the heads-up display 50, the danger level may be increased to a 2. The danger level determination unit determines that the driver 54 is utilizing the heads-up display 50 from the driver's line of sight 56 and the on/off data from the heads-up display 50.

In addition to watching a movie, working on a computer, or otherwise using the heads-up display 50, if the driver's head is tilted from the vertical position and the driver's breathing rate is slowed the predetermined threshold (for example, 10%) from the average (over the first 30 minutes of drive time), the danger level may be increased to a 3. The driver's head position and breathing rate may be determined and communicated by the driver inattention determination unit 88.

In addition to the driver's inattention, if there is a heavy traffic condition (FIG. 3), the danger level may be increased to a 4. For example only, a heavy traffic, or high volume traffic, condition may occur when at least two vehicles 10-1, 10-2, ..., 10-n are each within a threshold distance from the subject vehicle 10. The threshold distance may be within a range of 0 feet to 20 feet, and more specifically within a range of 10 feet to 15 feet. Further if there is a traffic jam within a predetermined distance from the vehicle 10 (for example, 3 miles ahead of the vehicle), the danger level may be increased to a 5. The heavy traffic condition and/or the traffic jam may be determined from data provided by the proximity sensors 20, the cameras 30, the GPS/GNSS 28, the DSRC System 24, data from other vehicles 10-1, 10-2 . . . 10-n, and communications from the vehicle path determination unit 84.

In addition to the driver's inattention, if the roadway has potholes 68 (for example, if there are two or more potholes in the roadway as shown in FIG. 5), the danger level may be increased to a 7. Whether there are potholes and the number of potholes may be determined by data from the proximity sensors 20 and cameras 30.

In addition to the driver's inattention, if an obstacle 70, such as a tire or other debris from a vehicle, is detected in the roadway (FIG. 5) within a predetermined threshold distance (for example, within 100 feet ahead of the vehicle 10), the danger level may be increased to a 10. The amount, location, and type of obstacle may be determined by data from the proximity sensors 20 and cameras 30. Additionally, if there is a previously undetected accident, traffic jam, or other road condition that is now detected in the roadway within the predetermined threshold distance (for example, within 100 feet ahead of the vehicle 10), the danger level may be increased to a 10.

The previously described danger level scale included with example scenarios is an example embodiment provided so that the disclosure is thorough. It is understood by one skilled in the art that the danger levels may be determined based on different scenarios and may be changed to suit the individual driver's needs.

The danger level determination unit 90 may communicate with an action determination unit 92. The action determination unit 92 receives the danger level from the danger level determination unit 90 and determines an action for the danger level. Different actions may be determined to be appropriate for differing danger levels, and the severity of the action may increase as the danger level increases. If the danger level is a threshold value (for example, 50% of the scale or higher) or higher, the screen 52 will be adjusted to help return the driver's attention to the road. For example, using the previously described scale, if the danger level is a 5 or higher, the screen 52 may be adjusted. In some embodiments, the screen 52 may fade (i.e. the transparency increases) in proportion to the danger level. If the danger level reaches 100% of the scale (for example, 10), the windshield 38 is clear and the sound is paused. A warning sound or other alert may also be triggered.

In another embodiment, the screen 52 may reduce in size (for example, to 30%) at a threshold danger level (for example, 50% of the danger scale or 5) and move to the center of the windshield 38, allowing the driver 54 to see directly in front of the vehicle 10. When the threshold danger level is the maximum level (i.e., 100% of the danger scale or 10), the screen 52 is removed from the windshield 38 so the windshield 38 is clear, and the word "ALERT" may appear on the windshield. Additionally, at the maximum danger level, the sound from the movie or computer on the screen 52 may be paused.

In another embodiment, the screen 52 may change from media to augmented reality in which the danger concern point is highlighted to draw the driver's attention (i.e., line of sight 56). The augmented reality screen 52 may be a see-through screen 52 that shows markers (for example, arrows 58, circles, or other markers) that can highlight obstacles. Using the previously described scale, example actions for various danger levels may be as follows.

For danger levels 0-4, the action determination unit 92 may determine that no action is necessary. In these danger levels, the driver is either attentive, or the driver is inattentive, but there are no hazards or unsafe conditions present. Thus, no action is warranted.

For danger levels 5 and 6, the screen 52 may reduce in size and/or move to the middle of the windshield 38. The reduction in size of the screen 52 indicates to the driver 54 that there are potential hazards. The movement of the screen 52 to the middle of the windshield 38 causes the driver's line of sight 56 to move to the middle of the windshield 38 and prepares the driver to focus on a hazard or driving condition.

For danger levels 7-9, the driver's movie may be paused or computer screen may be frozen. The screen 52 has already been reduced in size and moved to the middle of the windshield 38, so the driver's line of sight 56 should be directed towards the roadway ahead. By pausing/freezing the screen 52 the driver can refocus his attention and line of sight 56 to the hazards and driving conditions prompting the increased danger level.

For a danger level of 10, the screen 52 may be cleared from the windshield 38, an arrow 58 may be drawn to indicate the obstacle or condition, an alert may be sounded or triggered, or a sub-combination or combination of these may occur. The alert may be an audible alert, a tactile alert, or a combination thereof. The driver of the subject vehicle 10 may have the option to select which type of notification. This information would be received by the emergency screen reduction system 32 though the CAN system 72.

Examples of an audio notification may include an audible alarm or spoken message. Thus, the action determination unit 92 may send messages to a radio 94 or speaker 96 to project the audio notification. Examples of a tactile notification may be vibration of the steering wheel 46 or driver seat 40. Thus, the action determination unit 92 may communicate with the steering wheel control system or the driver seat control system to activate the tactile notification.

The action determination unit 92 communicates with the driver alert system 22 to request various actions for the different danger levels. For example, the action determination unit 92 may communicate with the heads-up display 50 to command a reduction in screen size and/or movement of the screen 52. The action determination unit 92 may communicate with the radio 94 and/or the speakers 96 to command an audible alarm. Further, the action determination unit 92 may communicate with the driver seat 40 and/or steering wheel 46 to command the tactile notification.

Figure 7:
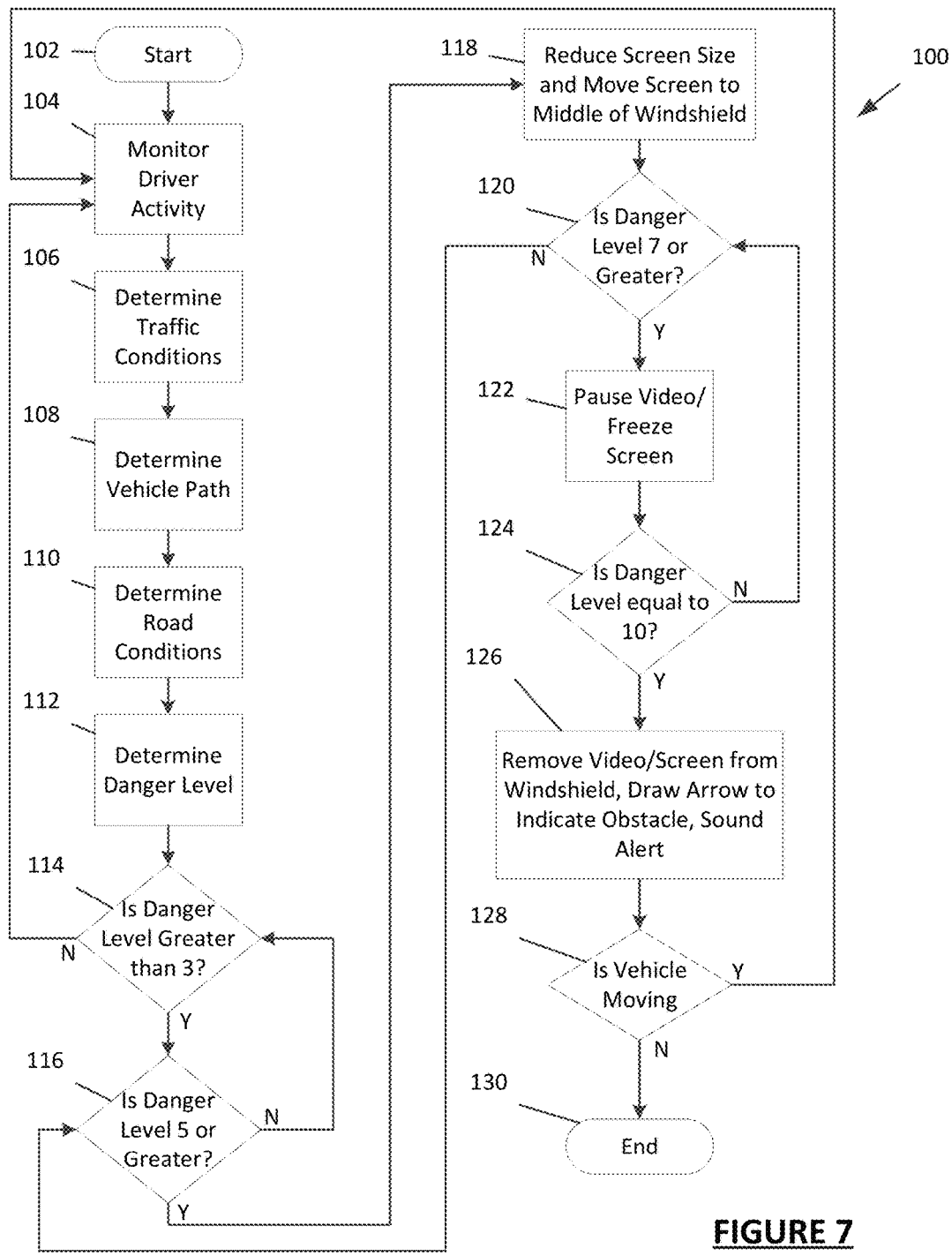
FIG. 7 illustrates a flow diagram for an example method according to the present teachings for detecting a danger level and providing various warnings to a driver of a hazardous condition.

With reference to FIG. 7, a flowchart for a method 100 is shown. The method 100 is configured to determine whether and when to provide various warnings to a driver of an obstacle or hazardous road condition. The method 100 can be performed by the system 12, the controller 26, the emergency screen reduction system 32, a combination thereof, or any other suitable control or processing device. The method 100 starts at 102.

At 104, the emergency screen reduction system 32 monitors the driver's activity. The emergency screen reduction system 32 receives data from the driver eye position sensor 74, the driver breathing rate sensors 76, and the heads-up display 50 and determines the driver's line of sight 56, the driver's breathing rate, the driver's head position, and the on/off state of the heads-up display 50.

At 106, the emergency screen reduction system 32 determines the traffic conditions on the roadway. The emergency screen reduction system 32 uses data communicated from the GPS/GNSS 28, the DSRC system 24, and the CAN system 72 determine the path of the subject vehicle 10 and whether there are any vehicles or objects within the path. Specifically, the emergency screen reduction system 32 may receive data from the DSRC system 24 indicating a heavy, moderate, or light traffic condition. The emergency screen reduction system 32 may also receive data indicating accidents or traffic jams.

At 108, the emergency screen reduction system 32 determines the vehicle path. The emergency screen reduction system 32 may receive location, speed, and direction data from the GPS/GNSS 28 that allows the emergency screen reduction system 32 to determine a vehicle path for the vehicle 10. The emergency screen reduction system 32 may also receive data from the sensors 80 (such as, for example, steering wheel angle and accelerator pedal position) which allows the emergency screen reduction system 32 to determine whether the vehicle path is straight ahead of the subject vehicle 10 or to the right or left of the subject vehicle 10.

At 110, the emergency screen reduction system 32 determines the road conditions such as the presence, location, and number of potholes, tires, vehicle debris, or other obstacles on the roadway. As previously stated, the emergency screen reduction system 32 receives data from the one or more proximity sensors 20 and/or the one or more cameras 30 to determine the location of other vehicles, people, road hazards, and objects around the subject vehicle 10.

At 112, the emergency screen reduction system 32 determines the danger level. The danger level, as previously described, may be selected from a scale and based on the attentiveness of the driver, the road conditions, and the traffic conditions. As the severity of the conditions increase, the danger level also increases.

At 114, the emergency screen reduction system 32 determines whether the danger level is greater than 3. As previously described, in an example danger scale, the danger level may be a zero if the driver 54 has complete control of the vehicle 10 and there are no hazards, heavy traffic conditions, or accidents in the vicinity. The danger level may be increased to a 1 if the vehicle is operating in autonomous mode. If the driver 54 elects to watch a video, work on a computer, or otherwise utilize the heads-up display, the danger level may be increased to a 2. In addition to watching a movie, working on a computer, or otherwise using the heads-up display 50, if the driver's head is tilted from the vertical position and the driver's breathing rate is slowed the predetermined threshold (for example, 10%) from the average (over the first 30 minutes of drive time), the danger level may be increased to a 3 due to the driver's inattention. In addition to the driver's inattention, if there is a heavy traffic condition (FIG. 3), the danger level may be increased to a 4.

If the danger level is not greater than 3 at 114, the emergency screen reduction system 32 continues monitoring the driver activity at 104, determining traffic conditions at 106, determining a vehicle path at 108, determining road conditions at 110, and determining a danger level at 112. If the danger level is greater than 3 at 114, the emergency screen reduction system 32 determines whether the danger level is 5 or greater at 116. For danger levels 0-4, the emergency screen reduction system 32 may determine that no action is necessary. In these danger levels, the driver is either attentive, or the driver is inattentive, but there are no hazards or unsafe conditions present. Thus, no action is warranted.

If the danger level is not 5 or more at 116, the emergency screen reduction system 32 determines whether the danger level is greater than 3 at 114. If there is a traffic jam within a predetermined distance from the vehicle 10 (for example, 3 miles ahead of the vehicle), the danger level may be increased to a 5. If the danger level is 5 or greater at 116, the emergency screen reduction system 32 reduces the screen size and moves the screen 52 to the middle of the windshield 38 at 118. For danger levels 5 and 6, the screen 52 may reduce in size and/or move to the middle of the windshield 38. The reduction in size of the screen 52 indicates to the driver 54 that there are potential hazards. The movement of the screen 52 to the middle of the windshield 38 causes the driver's line of sight 56 to move to the middle of the windshield 38 and prepares the driver to focus on a hazard or driving condition.

At 120, the emergency screen reduction system 32 determines whether the danger level is 7 or greater. In addition to the driver's inattention, if the roadway has potholes 68 (for example, if there are two or more potholes in the roadway as shown in FIG. 5), the danger level may be increased to a 7. If the danger level is not 7 or more at 120, the emergency screen reduction system 32 determines whether the danger level is 5 or greater at 116. If the danger level is 7 or greater at 120, the emergency screen reduction system 32 pauses the video or freezes the screen at 122. For danger levels 7-9, the driver's movie may be paused or computer screen may be frozen. The screen 52 has already been reduced in size and moved to the middle of the windshield 38, so the driver's line of sight 56 should be directed towards the roadway ahead. By pausing/freezing the screen 52 the driver 54 can refocus his attention and line of sight 56 to the hazards and driving conditions prompting the increased danger level.

At 124, the emergency screen reduction system 32 determines whether the danger level is equal to 10. In addition to the driver's inattention, if an obstacle 70, such as a tire or other debris from a vehicle, is detected in the roadway (FIG. 5) within a predetermined threshold distance (for example, within 100 feet ahead of the vehicle 10), the danger level may be increased to a 10. If the danger level is not equal to 10 at 124, the emergency screen reduction system 32 determines whether the danger level is 7 or greater at 120. If the danger level is equal to 10 at 124, the emergency screen reduction system 32 removes the video or screen 52 from the windshield 38, draws an arrow 58, or other indicator mark, on the windshield 38 to indicate the obstacle or hazard, triggers an alert, or performs a combination of these. The alert may be an audible alert, a tactile alert, or a combination thereof.

At 128, the emergency screen reduction system 32 determines whether the vehicle is running. The emergency screen reduction system 32 determines whether the vehicle 10 is running from data provided by sensors 80. The data may be in the form of engine rpm, engine on/off state, engine run time, etc. If the vehicle is running at 128, the emergency screen reduction system 32 returns to 104. If the vehicle is no longer running at 128, the method ends at 130.

In this way, the present teachings advantageously provide systems and methods to determine whether and when to provide various warnings to a driver of an obstacle or hazardous road condition. Thus, a driver who is working or watching a movie while the vehicle 10 is driven autonomously can be prepared or react during an emergency or road condition where driver intervention is necessary.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terms system, controller, module, and unit may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented with or by one or more computer programs executed by one or more processors. The computer programs include processor-executable instructions that are stored on at least one non-transitory tangible computer readable medium. The computer programs may also include and/or rely on stored data.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle for providing various warnings to a driver of an obstacle or hazardous road condition comprising:
   at least one of a camera and a proximity sensor for detecting the obstacle in a vehicle path;
   a screen projected on a windshield of the vehicle;
   a driver inattention determination unit that determines a driver attentiveness of the driver;
   a danger level determination unit that determines a danger level on a danger scale indicating a severity of situation and conditions of the vehicle according to the driver attentiveness, a driving condition, a driving hazard, and a presence of the obstacle, the danger level determination unit assigning the danger level to a percent of the danger scale and comparing the percent with a plurality of danger level thresholds of the danger scale; and a driver alert unit that reduces a size of the projected screen and moves the reduced screen to the middle of the windshield if the percent is greater than a first danger level threshold and removes the projected screen on the windshield if the percent is equal to the maximum level of the danger scale to allow the driver to see directly in front of the vehicle.

2. The vehicle of claim 1, wherein the driver attentiveness is based on one or more of the driver's head position, the driver's utilization of the screen projected on the windshield, the driver's breathing rate, the driver's eye path, the driver's eye lid position, the driver's heart rate, the driver's oxygen level, the driver's head movement, and the driver's body posture.

3. The vehicle of claim 1, wherein the driver alert unit reduces the projected screen on the windshield to 30% in size when the percent is greater than the first danger threshold level at 50%.

4. The vehicle of claim 1, wherein the driver alert unit further triggers at least one of an audible alert and a tactile alert when the percent is equal to the maximum level of the danger scale at 100%.

5. The vehicle of claim 1, wherein the driver alert unit replaces the projected screen with an augmented reality screen displaying markers to highlight obstacles when the percent is equal to the maximum level of the danger scale at 100%.

6. The vehicle of claim 1, wherein the driver alert unit increases a transparency of the projected screen on the windshield in proportion to the percent of the danger level.

7. A method for providing various warnings to a driver of an obstacle or hazardous road condition comprising:
projecting, a heads-up display of the vehicle, a screen on a windshield of a vehicle;
detecting, by at least one of a camera and a proximity sensor, an obstacle in a vehicle path;
determining, by a driver inattention determination unit, a driver attentiveness of the driver;
determining, by a danger level determination unit, a danger level on a danger scale indicating a severity of situation and conditions of the vehicle according to the driver attentiveness, a driving condition, a driving hazard, and a presence of the obstacle;
assigning, by the danger level determination unit, the danger level to a percent of the danger scale and comparing the percent with a plurality of danger level thresholds of the danger scale; and
reducing, by a driver alert unit, a size of the projected screen and moving the reduced screen to the middle of the windshield if the percent is greater than a first danger level threshold; and
removing, by the driver alert unit, the projected screen if the percent is equal to the maximum level of the danger scale to allow the driver to see directly in front of the vehicle.

8. The method of claim 7, further comprising determining the driver attentiveness based on one or more of the driver's head position, the driver's utilization of the screen projected on the windshield, the driver's breathing rate, the driver's eye path, the driver's eye lid position, the driver's heart rate, the driver's oxygen level, the driver's head movement, and the driver's body posture.

9. The method of claim 7, further comprising reducing, by the driver alert unit, the projected screen on the windshield to 30% in size when the percent is greater than the first danger threshold level at 50%.

10. The method of claim 7, further comprising triggering, by the driver alert unit, at least one of an audible alert and a tactile alert when the percent is equal to the maximum level of the danger scale at 100%.

11. The method of claim 7, further comprising replacing, by the driver alert unit, the projected screen with an augmented reality screen displaying markers to highlight obstacles when the percent is equal to the maximum level of the danger scale at 100%.

12. The method of claim 7, further comprising increasing, by the driver alert unit, a transparency of the projected screen on the windshield in proportion to the percent of the danger level.

* * * * *